(12) United States Patent
Sasaki (10) Patent No.: US 9,361,260 B2
(45) Date of Patent: Jun. 7, 2016

(54) MASTER DEVICE THAT CHANGES DATA COMMUNICATION SPEED WHEN PREPARATION TO DRIVE MOTOR IS COMPLETED

(71) Applicant: FANUC CORPORATION, Minamitsuru-gun, Yamanashi (JP)

(72) Inventor: Taku Sasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 48 days.

(21) Appl. No.: 13/916,684

(22) Filed: Jun. 13, 2013

(65) Prior Publication Data

US 2013/0346659 A1     Dec. 26, 2013

(30) Foreign Application Priority Data

Jun. 26, 2012   (JP) ................................ 2012-143452

(51) Int. Cl.
*G06F 13/00*     (2006.01)
*G06F 13/40*     (2006.01)

(52) U.S. Cl.
CPC ................................ *G06F 13/4068* (2013.01)

(58) Field of Classification Search
USPC ..................................... 710/110; 318/52, 801
See application file for complete search history.

(56) References Cited

U.S. PATENT DOCUMENTS 3,596,001 A * 7/1971 Clark .............................. 370/204
5,473,225 A * 12/1995 Miyazaki ......................... 318/52
5,499,374 A    3/1996 Di Giulio et al.
6,058,312 A * 5/2000 Kimura .......................... 455/445
6,510,184 B1 * 1/2003 Okamura ....................... 375/260
6,653,812 B1 * 11/2003 Huo et al. ...................... 318/801
7,005,819 B2 * 2/2006 Takai et al. ............... 318/400.02
7,133,602 B2 * 11/2006 Yamada ......................... 388/806
7,443,116 B2 * 10/2008 Kutsuna et al. ............... 318/139
7,619,390 B2 * 11/2009 Kim ............................... 320/134
7,821,219 B2 * 10/2010 Ishii .............................. 318/590

(Continued)

FOREIGN PATENT DOCUMENTS

CN      101594037 A      12/2009
JP         5153128 A       6/1993

(Continued)

OTHER PUBLICATIONS

Office Action dated Jun. 17, 2014, corresponds to German patent application No. 102013106497.3.

(Continued)

*Primary Examiner* — Paul R Myers
(74) *Attorney, Agent, or Firm* — Hauptman Ham, LLP (57) ABSTRACT

A first communication speed setting unit sets a data communication speed of data transmitted and received between the master device and the slave device during the period from the time when the master device is activated to the time when the preparation to drive the motors is completed, to a first communication speed. A second communication speed setting unit sets a data communication speed of data transmitted and received between the master device and the slave device when the preparation to drive the motor is completed, to a second communication speed lower than the first communication speed. A change notification unit notifies the change of the data communication speed from the first communication speed to the second communication speed to the slave device.

1 Claim, 4 Drawing Sheets

(56) References Cited

U.S. PATENT DOCUMENTS

| | | | |
|---|---|---|---|
| 8,232,753 B2 * | 7/2012 | Shimada et al. | 318/400.09 |
| 8,379,358 B2 * | 2/2013 | Takahashi et al. | 361/93.1 |
| 2006/0165393 A1 * | 7/2006 | Yamada | 388/806 |
| 2008/0238351 A1 | 10/2008 | Aoyama et al. | |
| 2009/0251831 A1 * | 10/2009 | Shiba et al. | 361/30 |
| 2009/0256505 A1 | 10/2009 | Maeda et al. | |

FOREIGN PATENT DOCUMENTS

| | | | |
|---|---|---|---|
| JP | 6153128 A | 5/1994 | |
| JP | 2001203635 A | 7/2001 | |
| JP | 2003265810 A | 9/2003 | |
| JP | 2003348892 A | 12/2003 | |
| JP | 2008-242728 A | 10/2008 | |

OTHER PUBLICATIONS

Office Action mailed Oct. 29, 2013, corresponds to Japanese patent application No. 2012-143452.

* cited by examiner

MASTER DEVICE THAT CHANGES DATA COMMUNICATION SPEED WHEN PREPARATION TO DRIVE MOTOR IS COMPLETED

BACKGROUND OF THE INVENTION

1. Field of the Invention

The present invention relates to a master drive that is connected to a slave device via a serial communication bus for carrying out data transmission and reception in order to control a motor connected via an inverter to a DC link part, which is connected to an alternating-current power source via a converter.

2. Description of Related Art

A master device that is connected to a slave device via a serial communication bus for carrying out data transmission and reception in order to control a motor in a system, which includes motors for driving a feed axis and a main axis of a machine tool, an industrial robot arm, etc., is proposed in, for example, Japanese Unexamined Patent Publication (Kokai) No. 2008-242728 (JP2008-242728A).

In such a system which includes the motors, the master device is comprised of a converter control device configured to control a converter in order to convert alternating-current power supplied from an alternating-current power source into direct-current power, an upper control device such as a CNC (computer numerical control), etc., and the slave device is implemented by an inverter control device configured to control an inverter in order to convert the direct-current power which is converted by a converter into alternating-current power, etc. For example, in the case where the master device is the converter control device and the slave device is the inverter control device, data such as status information, alarm information, etc., is shared between the converter control device and the inverter control device by carrying out data transmission and reception via a serial communication bus. In the case where the master device is the upper control device and the slave device is the inverter control device, data such as motor position or speed command data, etc., is transmitted from the upper control device to the inverter control device via the serial communication bus and data such as current value data, motor position or speed data, etc., is transmitted from the inverter control device to the upper control device via the serial communication bus, thereby the data is shared between the converter control device and the inverter control device.

A serial communication among a plurality of devices can transmit and receive an amount of data larger than the amount of data that can be transmitted and received by parallel communication with electric lines in a number smaller than the number of electric lines used for the parallel communication (for example, two electric lines are used in the case of $I^2C$ communication).

In the serial communication, if it is desired to increase the amount of data to be transmitted and received per unit time, it is necessary to increase the data communication speed, i.e., extend the bandwidth of a signal necessary to transmit data. In the case where the bandwidth of the signal necessary to transmit data is extended, it is also necessary to extend the bandwidth of a filter provided in at least one of the master device and the slave device in order to remove noise received in the serial communication. Therefore, as the bandwidth of the filter is extended, the influence of noise received in the serial communication increases.

Measures against the noise received in the serial communication are taken in order to extend the bandwidth of the signal necessary to transmit data and to maintain the serial communication with high reliability. As the measures against the noise received in the serial communication, there are an increase of the thickness of the cable used for the serial communication in accordance with an increase of the data communication speed in order to reduce an impedance of the cable used for the serial communication, an increase of the thickness of the shield for the cable used for the serial communication in accordance with an increase of the data communication speed in order to prevent fluctuations in the electric potential due to an external influence, a reduction of the length of the cable used for the serial communication in accordance with an increase of the data communication speed in order to reduce the impedance of the cable used for the serial communication, etc.

Consequently, the cost necessary to take measures against the noise received in the serial communication and restrictions on the length of the cable used for the serial communication increase as the data communication speed increases.

When controlling the motor, it is desirable to reduce the data transmission and reception time interval necessary to complete the data transmission and reception of data necessary to drive the motor between the master device and the plurality of slave devices through the serial communication bus as much as possible (for example, 1 msec) during the period from the time when the master device is activated to the time when the preparation to drive the motor is completed, in order to reduce the period from the time when the master device is activated to the time when the preparation to drive the motor is completed (period required to start-up the motor). There is an influence of switching of a switching element, which is included in equipment (for example, inverter) controlled by at least one of the master device and the slave devices, during the period from the time when the preparation to drive the motor is completed to the time when the motor is stopped, however, there is no such influence during the period from the time when the master device is activated to the time when the preparation to drive the motor is completed. Because of this, the noise received in serial communication during the period from the time when the master device is activated to the time when the preparation to drive the motor is completed is remarkably small compared to the noise received in serial communication during the period from the time when the preparation to drive the motor is completed to the time when the motor is stopped. Consequently, it is possible to set a first communication speed during the period from the time when the master device is activated to the time when the preparation to drive the motor is completed higher than a second communication speed during the period from the time when the preparation to drive the motor is completed to the time when the motor is stopped, in order to reduce the period required to start-up the motor as much as possible.

On the other hand, the data transmission and reception period necessary to periodically repeat data transmission and reception between the master device and the slave devices through the serial communication bus during the period from the time when the preparation to drive the motor is completed to the time when the motor is stopped, is fixed. Further, such a data transmission and reception period may be longer (for example, 1 sec) than the above-mentioned data transmission and reception time interval. In a severe noise environment in which there is an influence of switching of the switching element during the period from the time when the preparation to drive the motor is completed to the time when the motor is stopped, priority is given to secure data transmission and reception over fast data transmission and reception. Consequently, it is desirable that the above-mentioned second communication speed is lower than the above-mentioned first communication speed.

In the conventional motor control, the first communication speed is set to be equal to the second communication speed. That is, the data communication speed of data transmitted and received between the master device and the slave devices via the serial communication bus is fixed during the period from the time when the master device is activated to the time when the master device is stopped after the drive and stop of the motor are repeated. However, the cost necessary to take measures against the noise in serial communication and restrictions on the length of the cable used for serial communication is increased as the data communication speed increases in order to reduce the period required to start-up the motor. On the other hand, the period required to start-up the motor increases as the data communication speed is decreased in order to reduce the cost necessary to take measures against the noise in serial communication and restrictions on the length of the cable used for serial communication.

Consequently, in conventional motor control, it is difficult to reduce the period required to start-up the motor and at the same time, to reduce the cost necessary to take measures against the noise in serial communication and restrictions on the length of the cable used for serial communication.

SUMMARY OF THE INVENTION

As an aspect, the present invention provides a master device capable of reducing the period required to start-up the motor and at the same time, to reduce the cost necessary to take measures against the noise received in serial communication and restrictions on the length of the cable used for serial communication in order to control the motor.

According to an aspect of the present invention, the master device that is connected to a slave device via a serial communication bus for carrying out data transmission and reception in order to control a motor connected via an inverter to a DC link part, which is connected to an alternating-current power source via a converter, has: a first communication speed setting unit configured to set a data communication speed of data transmitted and received between the master device and the slave device during the period from the time when the master device is activated to the time when the preparation to drive the motors is completed, to a first communication speed; a second communication speed setting unit configured to set a data communication speed of data transmitted and received between the master device and the slave device when the preparation to drive the motors is completed, to a second communication speed lower than the first communication speed; and a change notification unit configured to notify the change of the data communication speed from the first communication speed to the second communication speed to the slave device.

Preferably, the second communication speed setting unit sets a data communication speed of data transmitted and received between the master device and the slave device during the period from the time when the preparation to drive the motors is completed to the time when the master device is stopped, to the second communication speed.

Preferably, the second communication speed setting unit sets a data communication speed of data transmitted and received between the master device and the slave device during the period from the time when the preparation to drive the motor is completed to the time when the motors are stopped, to the second communication speed, and the first communication speed setting unit sets a data communication speed of data transmitted and received between the master device and the slave device during the period from the time when the motors are stopped to the time when the preparation to restart the drive of the motors is completed or to the time when the master device is stopped, to the first communication speed.

Preferably, the master device according to the present invention further has a bandwidth change unit configured to change a bandwidth of a band variable filter provided in at least one of the master device and the slave device in order to remove noise received in the serial communication from a first bandwidth to a second bandwidth narrower than the first bandwidth, in accordance with the change of the data communication speed from the first communication speed to the second communication speed, in order to remove noise received in the serial communication.

According to the master device of an aspect of the present invention, it is possible to provide a master device capable of reducing the period required to start-up the motor and at the same time, to reduce the cost necessary to take measures against the noise received in serial communication and restrictions on the length of the cable used for serial communication in order to control the motor.

BRIEF DESCRIPTION OF THE DRAWINGS

The objects, features, and advantages of the present invention will be clear based on the descriptions in the following embodiments relating to the accompanying drawings. In the drawings.

DETAILED DESCRIPTION

Embodiments of the master device according to the present invention are explained with reference to the drawings. In the drawings, the same symbols are attached to the same components.

Figure 1:
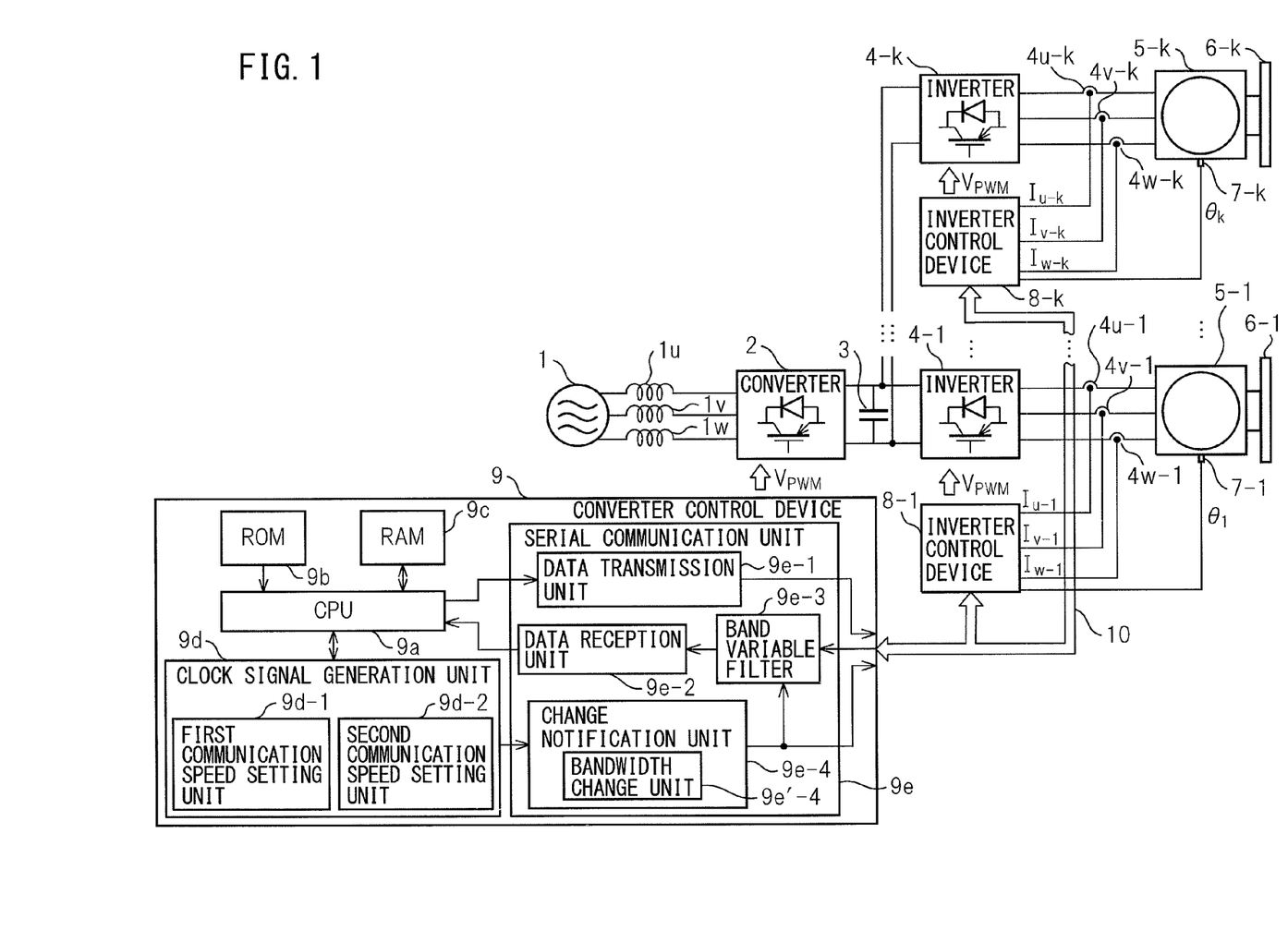
FIG. 1 is a block diagram of a system to which a master device according to the present invention is applied in order to control motors.

Referring to the drawings, FIG. 1 is a block diagram of a system to which the master device according to the present invention is applied in order to control motors. The system shown in FIG. 1 is used in a machine tool and has a three-phase alternating-current power source 1 as an alternating-current power source, a converter 2, a smoothing capacitor 3 as a DC link part, the number k (k is an integer not less than 1) of inverters 4-1, . . . , 4-$k$, the number k of motors 5-1, . . . , 5-$k$, the number k of driven objects 6-1, . . . , 6-$k$, the number k of rotation angle detection units 7-1, . . . , 7-$k$, the number k of inverter control devices 8-1, . . . , 8-$k$ as a slave device, and a converter control device 9 as a master device.

In the system shown in FIG. 1, data transmission and reception of data such as motor status information, alarm information, etc., between the converter control device 9 and the inverter control devices 8-1, . . . , 8-$k$ are carried out via a serial communication bus 10 (for example, I²C communication bus) in order to control the motors 5-1, . . . , 5-$k$.

The converter 2 consists of a plurality (six, in the case of three-phase alternating current) of rectifier diodes and transistors connected in inverse parallel to the rectifier diodes, respectively, for example, and converts alternating-current power supplied from the three-phase alternating-current power source 1 into direct-current power. The smoothing capacitor 3 is connected in parallel to the converter 2 in order to smooth a voltage rectified by the rectifier diode of the converter 2. Each of the inverters 4-1, . . . , 4-k is connected in parallel to the smoothing capacitor 3, consists of a plurality (six, in the case of three-phase alternating current) of rectifier diodes and transistors connected in inverse parallel to the rectifier diodes, respectively, for example, and converts the direct-current power into which converted by the converter 2 into alternating-current power by turning on and off the transistor based on PWM signals $V_{PWM1}, \ldots, V_{PWMk}$, to be explained later.

The motors 5-1, . . . , 5-k are driven by power stored in the smoothing capacitor 3. As the motors 5-1, . . . , 5-k, a gravity axis servo motor configured to drive the main axis of a machine tool in the gravity axis direction (Z-axis direction) by a feed screw mechanism, such as a ball screw and nut mechanism, a main axis motor configured to drive a tool attached to the main axis of a machine tool, a horizontal axis servo motor configured to drive a table of a machine tool to which a work is attached in the horizontal axis direction (for example, X-axis direction) by a feed screw mechanism, such as a ball screw and nut mechanism, etc., is used.

The driven objects 6-1, . . . , 6-k are driven by the motors 5-1, . . . , 5-k, respectively. For example, in the case where k=3 and the motors 5-1, . . . , 5-k are the gravity axis motor, the main axis motor, and the horizontal axis servo motor, respectively, the driven objects 6-1, . . . , 6-k are the main axis of the machine, the tool, and the table of the machine tool.

The rotation angle detection units 7-1, . . . , 7-k consist of rotary encoders configured to detect rotation angles $\theta_1, \ldots, \theta_k$ of the motors 5-1, . . . , 5-k as the positions or speeds of the motors, respectively.

The inverter control devices 8-1, . . . , 8-k sample current values of three phases of U-phase currents $I_{U-1}, \ldots, I_{U-k}$, V-phase currents $I_{V-1}, \ldots, I_{V-k}$, and W-phase currents $I_{W-1}, \ldots, I_{W-k}$, respectively, detected by current detection units 4u-1; 4v-1; 4w-1, . . . , 4u-k; 4v-k; 4w-k provided in the output lines of the inverters 4-1, . . . , 4-k, respectively, as current value data of the motors 5-1, . . . , 5-k, respectively, and sample the rotation angles $\theta_1, \ldots, \theta_n$, respectively, as position or speed data of the motors, respectively, in order to control the inverters 4-1, . . . , 4-k, respectively.

Then, the inverter control devices 8-1, . . . , 8-k generate the PWM signals $V_{PWM1}, \ldots, V_{PWMk}$ to drive the motors 5-1, . . . , 5-k, respectively, based on the sampled current value data and position or speed data of the motors, and position or speed command data of the motors from an upper control device, not shown schematically for simplification.

The current detection units 4u-1; 4v-1; 4w-1, . . . , 4u-k; 4v-k; 4w-k consist of, for example, hole elements, respectively, and the upper control device, not shown schematically, consists of, for example, a CNC (computer numerical control).

In the system shown in FIG. 1, the upper control device, not shown schematically, outputs an alternating-current power source regeneration command signal to the converter control device 9 in order to carry out alternating-current power source regeneration to return regenerative energy generated during speed reduction of the motors 5-1, . . . , 5-k to the three-phase alternating-current power source 1 side.

In this case, the upper control device, not shown schematically, outputs the position or speed command data corresponding to a PWM signal $V_{PWM}$ to the inverter control devices 8-1, . . . , 8-k, respectively, in order for the inverter control devices 8-1, . . . , 8-k to control the turning on and off of the transistors of the inverters 4-1, . . . , 4-k by outputting the PWM signals $V_{PWM1}, \ldots, V_{PWMk}$ to the inverters 4-1, . . . , 4-k, respectively.

The converter control device 9 generates a PWM signal $V_{PWM}'$ based on the alternating-current power source regeneration command signal and outputs the PWM signal $V_{PWM}'$ to the converter 2 in order to perform alternating-current power source regeneration. Further, in the system shown in FIG. 1, reactors 1u, 1v, and 1w are arranged between the three-phase alternating-current power source 1 and the converter 2 in order to perform alternating-current power source regeneration.

The converter control device 9 has a CPU 9a, a ROM 9b, a RAM 9c, a clock signal generation unit 9d, and a serial communication unit 9e. The CPU 9a executes programs to carry out various kinds of operation. The ROM 9b stores the programs and various kinds of data relating to the performance, etc., of the converter control device 9. The RAM 9c temporarily stores data of the result of calculation by the CPU 9a, data such as motor status information, which is transmitted from the inverter control devices 8-1, . . . , 8-k via the serial communication bus 10, and data from the upper control device, not shown schematically.

The clock signal generation unit 9d generates a first serial clock signal, which corresponds to a first communication speed f1 (for example, 500 kHz) set for fast data transmission and reception and a second serial clock signal, which corresponds to a second communication speed f2 (for example, 250 kHz) set to give priority to secure data transmission and reception over fast data transmission and reception, lower than the first communication speed f1. Then, the clock signal generation unit 9d outputs the first serial clock signal and the second serial clock signal that are generated to the CPU 9a and the serial communication unit 9e. To do this, the clock signal generation unit 9d consists of an oscillation element, an oscillation circuit, a baud rate setting register, a baud rate generator, etc.

In the system shown in FIG. 1, the clock signal generation unit 9d has a first communication speed setting unit 9d-1 and a second communication speed setting unit 9d-2. The first communication speed setting unit 9d-1 generates a first serial clock signal to set the first communication speed f1 and outputs the first serial clock signal to the CPU 9a and the serial communication unit 9e during the period from the time when the converter control unit 9 is activated to the time when the preparation to drive the motors 5-1, . . . , 5-k is completed. Whether or not the preparation to drive the motors 5-1, . . . , 5-k is completed is determined by, for example, the CPU 9a, which determines that all of the data necessary to drive the motors 5-1, . . . , 5-k is transmitted and received between the converter control device 9 and the inverter control devices 8-1, . . . , 8-k via the serial communication bus 10. The second communication speed setting unit 9d-2 generates a second serial clock signal to set the second communication speed f2 and outputs the second serial clock signal to the CPU 9a and the serial communication unit 9e when the preparation to drive the motors 5-1, . . . , 5-k is completed. Consequently, the second communication speed setting unit 9d-2 changes the data communication speed from the first communication speed to the second communication speed when the preparation to drive the motors 5-1, . . . , 5-k is completed.

In the system shown in FIG. 1, power is supplied from a power source, not shown schematically, to the converter control device 9, the converter control device 9 enters the activated state at the same time as the supply of power from the power source, not shown schematically, is started, and the converter control device 9 stops the operation thereof at the same time as the supply of power from the power source, not shown schematically, is stopped. Further, in the system shown in FIG. 1, the motors 5-1, ..., 5-k are driven after the preparation to drive the motors 5-1, ..., 5-k is completed, and the drive of the motors 5-1, ..., 5-k is stopped based on the command from an upper control device, not shown schematically.

The serial communication unit 9e carries out serial communication between the converter control device 9 and the inverter control devices 8-1, ..., 8-k via the serial communication bus 10. To do this, the serial communication unit 9e has a data transmission unit 9e-1, a data reception unit 9e-2, a band variable filter 9e-3, a communication speed change unit 9e-3, and a change notification unit 9e-4.

The data transmission unit 9e-1 transmits data such as the alarm information, etc., to the inverter control devices 8-1, ..., 8-k via the serial communication bus 10. The data reception unit 9e-2 receives data such as the alarm information, etc., from the inverter control devices 8-1, ..., 8-k via the serial communication bus 10 and the band variable filter 9e-3.

The band variable filter 9e-3 filters the data received from the inverter control devices 8-1, ..., 8-k via the serial communication bus 10. Further, the band variable filter 9e-3 changes the bandwidth from the first bandwidth to the second bandwidth narrower than the first bandwidth in response to the bandwidth change command from the change notification unit 9e-4.

The change notification unit 9e-4 outputs the first serial clock signal, which is transmitted from the first communication speed setting unit 9d-1, to the inverter control devices 8-1, ..., 8-k during the period from the time when the converter control device 9 is activated to the time when the preparation to drive the motors 5-1, ..., 5-k is completed. Further, the change notification unit 9e-4 outputs the second serial clock signal, which is transmitted from the second communication speed setting unit 9d-2, to the inverter control devices 8-1, ..., 8-k, as the communication speed change notification data to the effect that the data communication speed is changed from the first communication speed f1 to the second communication speed f2 when the preparation to drive the motors 5-1, ..., 5-k is completed.

In the system shown in FIG. 1, the change notification unit 9e-4 has a bandwidth change unit 9e'-4 configured to output a bandwidth change command to the band variable filter 9e-3, in accordance with the change from the first communication speed f1 to the second communication speed f2.

Figure 2:
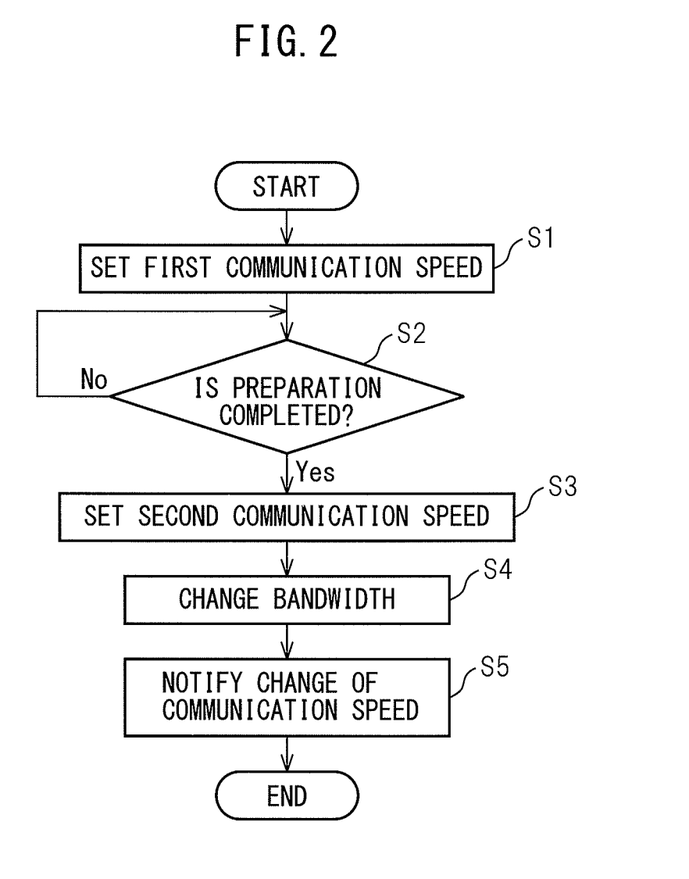
FIG. 2 is a flowchart of an operation of a converter control device in FIG. 1.

FIG. 2 is a flowchart of the operation of the converter control device in FIG. 1, which is started immediately after the converter control device 9 is activated.

First, the first communication speed setting unit 9d-1 generates the first serial clock signal to set the first communication speed f1 (step S1). Next, the CPU 9a determines whether or not the preparation to drive the motors 5-1, ..., 5-k is completed (step S2), and if it is determined that the preparation to drive the motors 5-1, ..., 5-k is completed, the second communication speed setting unit 9d-2 generates the second serial clock signal to set the second communication speed f2 (step S3). Next, the bandwidth change unit 9e'-4 outputs the bandwidth change command to the band variable filter 9e-3 (step S4). Next, the change notification unit 9e-4 outputs the second serial clock signal, which corresponds to the communication speed change notification data, to the inverter control devices 8-1, ..., 8-k (step S5), and exits the processing.

According to the above-mentioned embodiment, the data communication speed of data transmitted and received between the converter control device 9 and the inverter control devices 8-1, ..., 8-k when the preparation to drive the motors 5-1, ..., 5-k is completed, is set to the second communication speed lower than the first communication speed, which is the data communication speed of data transmitted and received between the converter control device 9 and the inverter control devices 8-1, ..., 8-k during the period from the time when the converter control device 9 is activated to the time when the preparation to drive the motors 5-1, ..., 5-k is completed. Consequently, it is possible to reduce the period required to start-up the motors 5-1, ..., 5-k, and to reduce the cost necessary to take measures against the noise received in serial communication and restrictions on the length of the cable used for serial communication in order to control the motors 5-1, ..., 5-k.

In the flowchart shown in FIG. 2, the second communication speed setting unit 9d-2 sets the data communication speed of data transmitted and received between the converter control device 9 and the inverter control devices 8-1, ..., 8-k during the period from the time when the preparation to drive the motors 5-1, ..., 5-k is completed to the time when the converter control device 9 is stopped, to the second communication speed.

However, it is also possible to set the data communication speed of data transmitted and received between the converter control device 9 and the inverter control devices 8-1, ..., 8-k during the period from the time when the preparation to drive the motors 5-1, ..., 5-k is completed to the time when the motors 5-1, ..., 5-k or the converter control device 9 is stopped, to the second communication speed by the second communication speed setting unit 9d-2, and to set the data communication speed of data transmitted and received between the converter control device 9 and the inverter control devices 8-1, ..., 8-k during the period from the time when the motors 5-1, ..., 5-k are stopped to the time when the preparation to restart the drive of the motors 5-1, ..., 5-k is completed or the master device is stopped, to the first communication speed by the first communication speed setting unit 9d-1.

In this case, it is possible to reduce the idling time of the converter control device 9 and the inverter control devices 8-1, ..., 8-k during the period from the time when the drive of the motors 5-1, ..., 5-k is stopped to the time when the preparation to restart the drive is completed.

Further, there is no influence of switching of the switching element included in the converter 2 controlled by the converter control device 9 and switching of the switching element in the inverters 4-1, ..., 4-k controlled by the inverter control devices 8-1, ..., 8-k, during the period from the time when the drive of the motors 5-1, ..., 5-k is stopped to the time when the preparation to restart the drive is completed.

Figure 3:
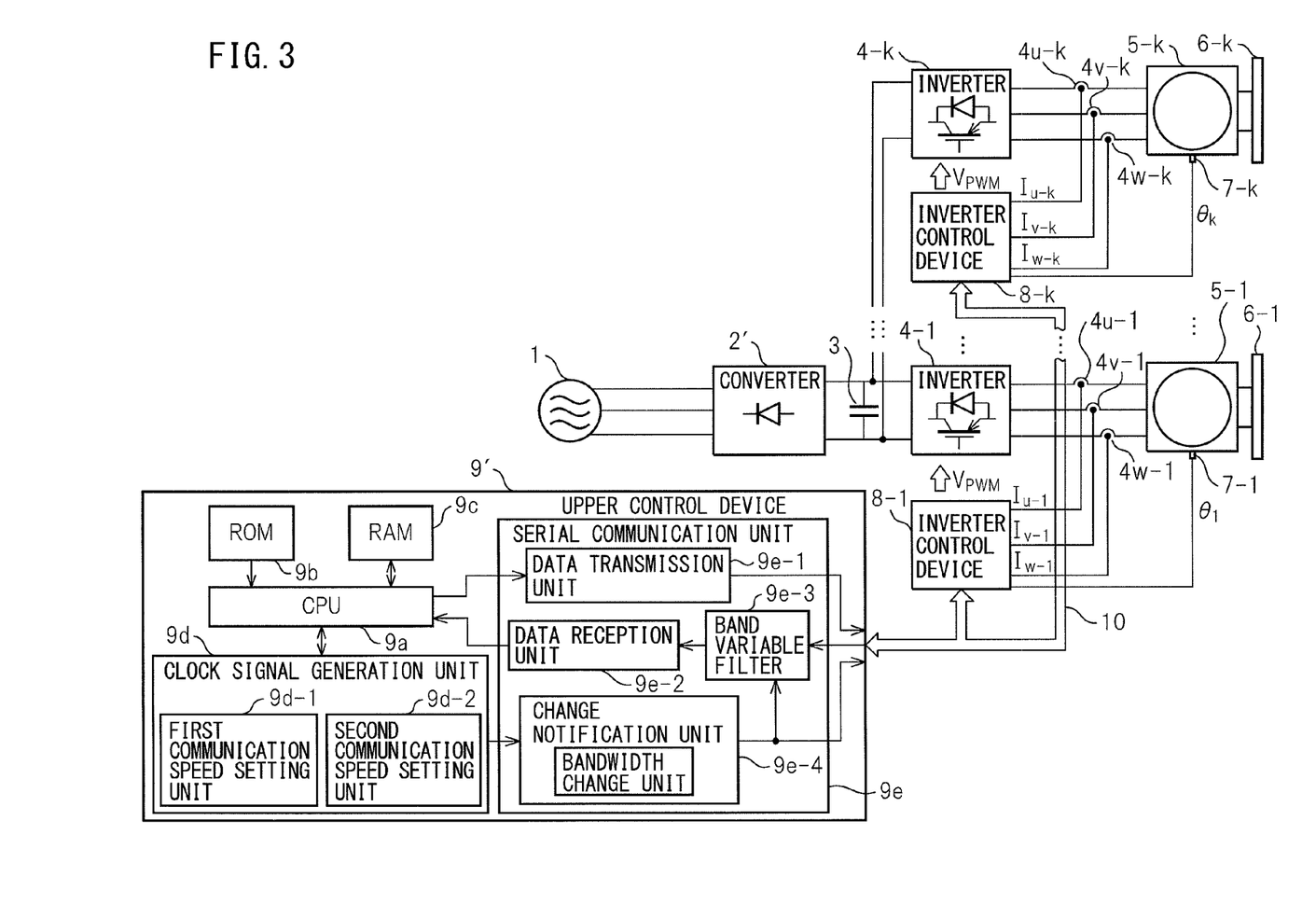
FIG. 3 is a block diagram of another system to which the master device according to the present invention is applied in order control motors.

FIG. 3 is a block diagram of another system to which the master device according to the present invention is applied in order to control motors. In the system shown in FIG. 3, an upper control device 9' is used as the master device in place of the converter control device 9 and a converter 2' is arranged between the three-phase alternating-current power source 1 and the smoothing capacitor 3 in place of the reactors 1u, 1v, and 1w, and the converter 2 in FIG. 1.

The upper control device 9' has the CPU 9a, the ROM 9b, the RAM 9c, the clock signal generation unit 9d, and the serial communication unit 9e in FIG. 1. Further, the upper control device 9' transmits data such as motor position or speed command data, etc., to the inverter control devices 8-1, ..., 8-$k$ via the serial communication bus 10 and receives data, such as current value data and position or speed data of the motor, from the inverter control devices 8-1, ..., 8-$k$ via the serial communication bus 10.

Figure 4:
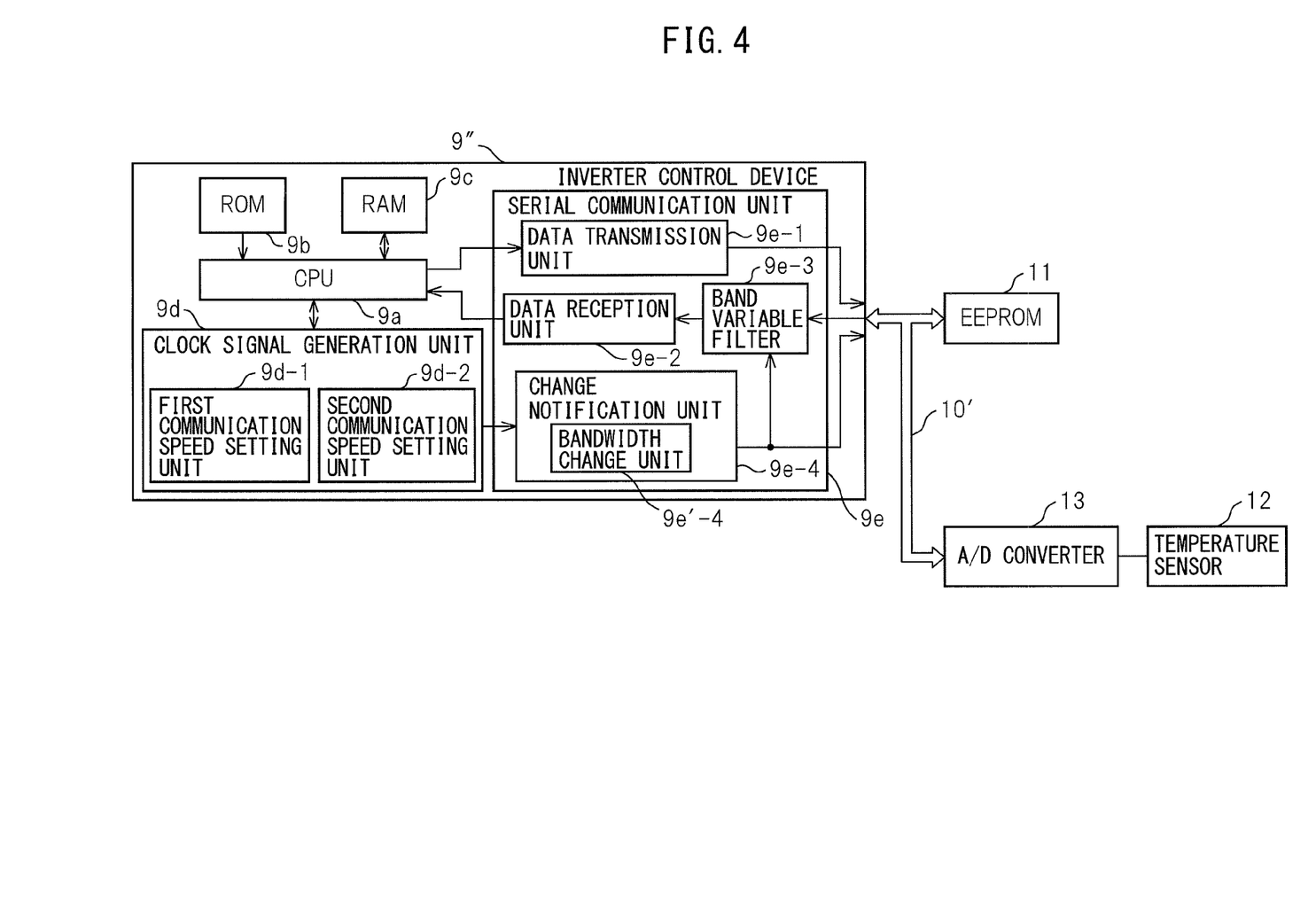
FIG. 4 is a block diagram of another system to which the master device according to the present invention is applied in order control motors

FIG. 4 is a block diagram of another system to which the master device according to the present invention is applied in order to control motors. The system shown in FIG. 4 has an inverter control device 9" as the master device, which corresponds to one of the inverter control devices 8-1, ..., 8-$k$ shown in FIG. 1 and FIG. 3, an EEPROM 11 as the slave device in which various kinds of data acquired before the inverter control device 9" is activated are stored, an A/D converter 13 as the slave device connected to a temperature sensor 12 configured to detect the temperature of the motor, which corresponds to one of the motors 5-1, ..., 5-$k$ shown in FIG. 1 and FIG. 3, and a serial bus 10' configured to carry out data transmission and reception of data between the inverter control device 9" and the EEPROM 11 and between the inverter control device 9" and the A/D converter 13.

The inverter control device 9" has the CPU 9$a$, the ROM 9$a$, the RAM 9$c$, the clock signal generation unit 9$d$, and the serial communication unit 9$e$ in FIG. 1. Further, the inverter control device 9" transmits data such as a command to read data stored in the EEPROM 11, a calculation result of the CPU 11$a$, etc., to the EEPROM 11 via the serial communication bus 10' and receives data stored in the EEPROM 11 from the EEPROM 11 via the serial communication bus 10'. Furthermore, the inverter control device 9" transmits data such as a command to read temperature data obtained by subjecting analog data of temperature acquired by the temperature sensor 13 to A/D conversion, to the A/D converter 13 via the serial communication bus 10' and receives data, which is acquired by the A/D converter 13, from the A/D converter 13 via the serial communication bus 10'.

The present invention is not limited to the above-mentioned embodiments and there can be a variety of modifications and different shapes. For example, it is possible to use the master device according to the present invention in a machine other than a machine tool, an industrial robot, etc. Further, it is possible to implement the master device by a device other than the converter control device 9, the upper control device 9' and the inverter control device 9", and to implement the slave device by a device other than the inverter control devices 8-1, ..., 8-$k$, the EEPROM 12 and the A/D converter 14. Further, it is also possible to use RS422 serial communication, etc., as serial communication.

The three-phase alternating-current power source 1 is used as an alternating-current power source in the system shown in FIGS. 1 and 3, however, it is also possible to use a multi-phase alternating-current power source other than the three-phase alternating-current power source as an alternating-current power source. Further, it is possible to constitute the rotation angle detection units 7-1, ..., 7-$k$ by a part (for example, hole element or resolver) other than the rotary encoder. Further, it may also be possible to detect only two phases of currents (for example, U-phase current and V-phase current) of the U-phase current, the V-phase current, and the W-phase current instead of detecting all of the U-phase current, the V-phase current, and the W-phase current.

Furthermore, in the above-mentioned embodiments, the case where the band variable filter 9$e$-3 is provided in the converter control device 9, the upper control device 9' and the inverter control device 9" is explained, however, it is also possible to provide the band variable filter 9$e$-3 in the inverter control devices 8-1, ..., 8-$k$.

As above, the present invention is explained in relation to the preferred embodiments thereof, however, it should be understood by a person skilled in the art that various alterations and modifications can be made without deviating from the scope disclosed by the claims.

The invention claimed is:
1. A master device that is connected to a slave device via a serial communication bus for carrying out data transmission and reception in order to control motors connected via an inverter to a DC link part, which is connected to an alternating-current power source via a converter, the master device comprising:
   a first communication speed setting unit configured to set a data communication speed of data transmitted and received between the master device and the slave device during the period from the time when the master device is activated to the time when the preparation to drive the motors is completed, to a first communication speed;
   a second communication speed setting unit configured to set a data communication speed of data transmitted and received between the master device and the slave device when the preparation to drive the motors is completed, to a second communication speed lower than the first communication speed;
   a change notification unit configured to notify the change of the data communication speed from the first communication speed to the second communication speed to the slave device; and
   a bandwidth change unit configured to change a bandwidth of a band variable filter provided in at least one of the master device and the slave device in order to remove noise received in the serial communication from a first bandwidth to a second bandwidth narrower than the first bandwidth, in accordance with the change of the data communication speed from the first communication speed to the second communication speed, in order to remove noise received in the serial communication.

* * * * *